United States Patent [19]

Carmien

[11] 4,451,073
[45] May 29, 1984

[54] FLEXIBLE CORE FOR TOOL HANDLES

[76] Inventor: Joseph A. Carmien, 525 Maple Ave., Beverly Hills, Calif.

[21] Appl. No.: 407,819

[22] Filed: Aug. 13, 1982

[51] Int. Cl.³ .......................... A01B 1/22; B25G 3/24
[52] U.S. Cl. ...................................... 294/57; 294/54.5
[58] Field of Search .................... 294/54.5, 57, 55, 49, 294/51, 52, 53, 58, 24, 27 H, 86 H; 37/53, 41, 162, 130, 134; 16/110

[56] References Cited
U.S. PATENT DOCUMENTS 4,050,727 9/1977 Bonnes ................................. 294/57
4,280,727 7/1981 Germain ............................ 294/54.5

Primary Examiner—James B. Marbert
Attorney, Agent, or Firm—Fulwider, Patton, Rieber, Lee & Utecht

[57] ABSTRACT

A flexible core is provided for insertion in the handle receiving socket of a tool blade, such as a shovel. This flexible core provides compressive support inside the handle socket to prevent buckling or collapse of the socket when the socket is subjected to high bending stress.

5 Claims, 3 Drawing Figures

U.S. Patent     May 29, 1984     4,451,073
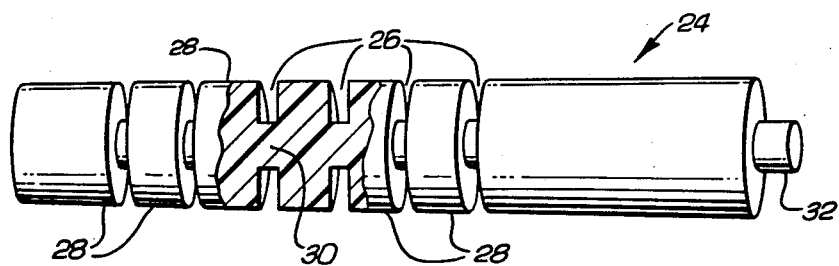
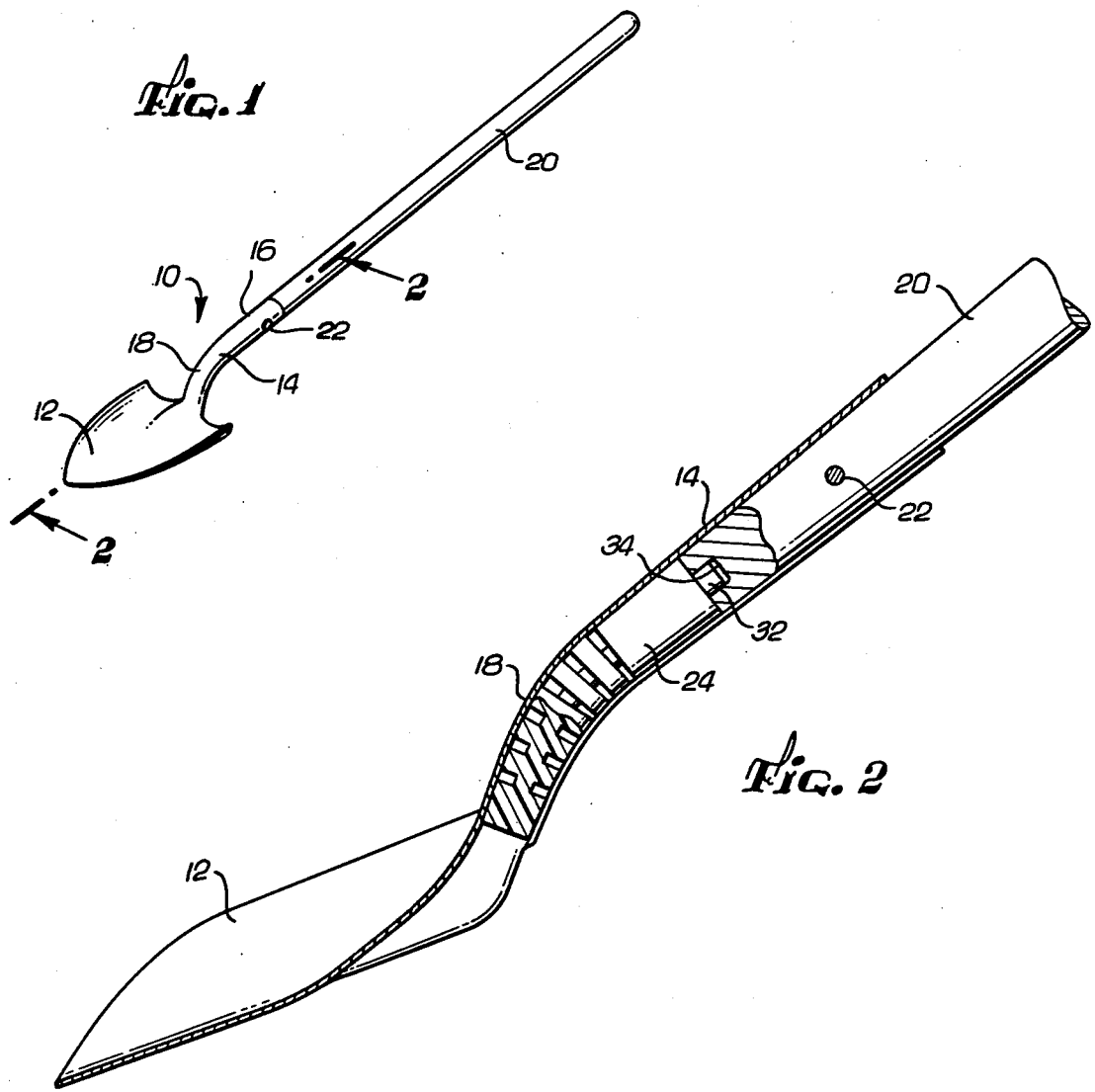

FLEXIBLE CORE FOR TOOL HANDLES

BACKGROUND OF THE INVENTION

This invention relates generally to the attachment of handles to tools such as shovels, pitchforks or the like, and more particularly to a flexible core for insertion into a portion of the handle socket of such a tool to prevent the collapse of that portion during use of the tool.

Historically, most shovels and spades have been produced with a socket ranging from 6" to 24" long, projecting from the spade blade consisting of a sheath of metal, usually steel, wrapped around to form a conical socket into which a wood handle is inserted and fixed by means of rivets, screw, nails, collars, or the like. The primary reason for this traditional socket over many hundreds of years is that the traditional handle material has been wood and the projecting socket of metal was required to develop an attachment method that would generate adequate strength at the connection to allow the shovel handle made of wood to do its job plus resist collapse of the tubular socket adjacent to the blade when subjected to bending stress.

Depending on the difficulty of the operation, the length of the shovel handle, and the quality of the wood in the shovel handle, the socket was made longer or shorter. Further, in regard to the difficulty of the task to which the shovel was to be applied, the blade was produced either by stamping and forming metal sheet stock, or in very difficult operations, using a billet and forging a heavy duty blade. In virtually all operations whether the shovel blade was made from very thin metal for very low priced and light weight work, or forged from a billet, the handle socket was formed by rolling the sheet or forged stock into a conical section, and the conical section was prevented from opening up by means of either welding the edges together or bolting through the handle shaft stock so that the conical section could not spread out or open up when load was applied on the handle.

The sockets for the spade, shovels, forks, or the like usually are either a straight conical socket, that is straight from the opening which will accept the wood handle to the connection or attachment, or junction of the tool blade, or the socket was curved as it approached the smallest point of the socket section so as to create a desired angle between the plane of the blade and the axis of the shovel handle. Not all angles of different model shovels or for that matter, different makers, are the same, even though the traditional diameter of the shovel handle remains almost universal at about $1\frac{1}{2}"$ at the entrance to the metal socket.

Using the traditional material—wood—for a handle, and turning a conical section on the end to be attached to the shovel to match the internal conical section of the blade socket, provided a secondary value in that the wood being a solid cross section and with acceptable compressive strengths could act as a filler the full length of the metal socket of the blade. This filler is necessary to resist a compressive failure of the metal conical section when the tool is used as a pry in either digging or actually prying. This failure will occur on every quality tool at a relatively low load level if a core is not inserted which has adequate compressive strength to prevent the collapse of the conical tubing section which has been created out of sheet stock or by forging.

Because the fiberglass shaft is produced from a thermosetting resin which is irreversible, that is, it cannot be softened by re-application of heat, it is not practical nor is it necessary to use the quality (and cost) of fiberglass to project into the socket of the tool blade where only compressive strength is needed. Moreover, it is particularly difficult and costly to attempt to machine, in some fashion, the fiberglass to be inserted in a socket which has an angle or curve as above described.

For handles originally fitted at the factory, wood can be so used as it can be autoclaved or steamed until malleable, and while malleable, driven into the socket at which time the wooden tip can be formed to fit the angled or curved section of the socket. On wood replacement handles, it is the practice to put one or more longitudinal slits in the handle at the socket end to allow the section to dry or cold form to a better degree into the curved sockets. This is not the best solution, but it is the best solution presently available.

SUMMARY OF THE INVENTION

The present invention resides in a flexible core adapted for insertion into the socket of a tool blade, such as a shovel. The core occupies that portion of the socket which is not occupied by the tool handle, thereby preventing buckling or collapse of the socket during use of the tool. Moreover, the flexible core of the present invention is relatively inexpensive to manufacture, and can be adapted for use in any size of tool socket and in a wide variety of tools.

More specifically, the flexible core of the present invention includes a generally cylindrical elongated product having a continuous central shaft or a diameter substantially less than the inside diameter of the tool socket with which it is to be used, and a series of generally cylindrical fillers spaced from one another along the core. The cylindrical fillers have an outside diameter substantially equal to the inside diameter of the socket. The outside diameter of the fillers may decrease along the length of the core, permitting the core to take on the shape of a frustum of a cone to more closely match the shape of the inside of the tool socket.

With the fillers spaced from one another along the central shaft, the core of the present invention becomes flexible and can be driven into a curved portion of a tool socket, if necessary. The flexible core of the present invention is preferably molded of, for example, polyethylene, polypropylene, or nylon, and can include a projection or stud at its outer end to facilitate attachment to a tool handle, if desired.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a long handled spade shovel of the type with which the present invention is intended for use;

FIG. 2 is an enlarged fragmentary view, partly in section, of the shovel illustrated in FIG. 1, with the section taken generally along the line 2—2 of FIG. 1; and FIG. 3 is a further enlarged perspective view of the flexible core of the present invention shown partly in section.

DETAILED DESCRIPTION

As shown in the exemplary drawings, the present invention is intended for use with hand tools, and such as shovels, pitchforks, or long handled spades, such as the spade 10 illustrated in FIG. 1. The spade 10 is comprised of a tool portion including a shovel blade 12 and a handle socket 14. In this instance, the handle socket 14 includes a generally straight handle receiving portion 16 and a curved portion 18 adjacent the juncture of the handle socket and blade. An elongated handle 20 is inserted into the handle receiving portion 16 of the socket 14 and is retained therein by any suitable means, such as by a bolt or rivet 22. The handle 20 can be made of a large variety of materials, but the present invention is primarily intended for use with tool handles formed of fiberglass.

Although wooden handles are frequently inserted into a tool socket throughout its length, including a curved portion thereof, fiberglass handles need only be inserted into a tool socket a relatively short distance, due to the vastly superior strength of fiberglass compared to wood. As can best be seen in FIG. 2, if the handle 20 is made of fiberglass, it need only be inserted part way into the tool socket 14 and secured therein by the bolt or rivet 22 to provide sufficient strength for normal use of the tool. With this arrangement, however, the curved portion 18 of the handle socket 14 would be empty and therefore subject to buckling or collapsing if subjected to a high bending stress such as is likely to occur during normal use of a shovel.

In accordance with the present invention, a flexible core 24 is inserted into the handle socket 14 prior to insertion of the handle 20, and the core is thereafter driven into the curved portion 18 of the socket 14 to provide compressive support for that portion of the socket and prevent the type of failures described above. The flexible core 24 can be sized and shaped to correspond to the shape of the lower end of any tool socket in which it may be used, and in this connection is generally an elongated frustum of a cone, since the interior of most handle sockets 14 is slightly tapered.

To provide for flexibility of the flexible core 24, a series of grooves 26 are formed around the periphery of the core and spaced from each other along the length of the core forming a series of socket fillers 28 which serve to support the tool socket 14. As mentioned above, the outside diameter of the flexible core 24 can be constant, forming an elongated cylinder, but more often it will be tapered slightly to conform to the interior shape of most common tool sockets. The series of peripheral grooves 26 leaves a central shaft 30 running continuously along the axis of the core 24, and that shaft 30 is flexible enough to bend and conform to the curved portion 18 of a tool socket 14 when the core 24 is driven into the socket. This bending is further facilitated by the spaces provided between the socket fillers 28.

The flexible core 24 is preferably formed of an easily molded material such as, for example, polyethylene, polypropylene, or nylon. In a typical application, the core 24 can be about 5½ inches long and have a diameter of about 1.5 inches at its large end, tapering to a diameter of about 1 inch at its smaller end. In such an application, the central shaft 30 can have a diameter of about 0.375 inches. If desired, the central shaft 30 can be tapered toward the small end of the core 24 as well.

If it is desired to attach the flexible core 24 to the end of a handle 20 before insertion of the handle and core assembly into a tool socket 14, a projection or stud 32 can be provided on the larger or outer end of the core 24 to cooperate with a recess 34 formed in the end of the handle 20. With this arrangement, the projection 32 can be inserted into the recess 34 and retained therein by glue or the like so that the handle and core can be inserted into the tool socket 14 as a single unit.

From the foregoing, it will be appreciated that the flexible core 24 of the present invention provides a means by which fiberglass or other tool handles which do not need to be fully inserted into a handle socket 14, or cannot be fully inserted due to the curvature of the socket 14, can be employed as original or replacement handles with ordinary, presently existing tools. Moreover, the flexible core 24 of the present invention is relatively inexpensive to manufacture and can be adapted for use in any size or shape of tool socket and with a wide variety of tools.

While a particular form of the invention has been illustrated and described, it will be apparent that various modifications can be made without departing from the spirit and scope of the invention.

I claim:

1. A flexible core for insertion into a handle receiving socket of a hand tool, said core comprising:
    an elongated, generally cylindrical body;
    a plurality of grooves formed in said body and spaced from one another along said body, forming at least one socket filler for bearing compressive load in said handle receiving socket; and
    a flexible shaft capable of bending to permit said core to conform to the shape of said handle receiving socket.

2. A flexible core as set forth in claim 1 wherein the outside of said generally cylindrical body is tapered to form a frustum of a cone.

3. A flexible core as set forth in claim 1 wherein a series of said grooves are spaced apart from one another forming a series of socket fillers spaced from one another.

4. A flexible core as set forth in claim 3, wherein said grooves also form said flexible shaft.

5. A flexible core as set forth in claim 1, further including means projecting from one end of said core for engagement with a handle to be received in said socket.

* * * * *